(12) United States Patent
Welch, Jr.

(10) Patent No.: US 6,303,911 B1
(45) Date of Patent: Oct. 16, 2001

(54) DEVICE AND METHOD FOR CONTROLLING THE TEMPERATURE OF A THIN FILM RESISTIVE HEATER

(75) Inventor: Ronald F. Welch, Jr., Oak Ridge, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/481,785

(22) Filed: Jan. 12, 2000

(51) Int. Cl.[7] .................................................. H05B 1/02
(52) U.S. Cl. ............................ 219/497; 219/483; 219/486
(58) Field of Search ............................ 219/482–485, 219/488, 490, 494, 497

(56) References Cited

U.S. PATENT DOCUMENTS

| 4,523,084 | * | 6/1985 | Tamura et al. | 219/497 |
| 4,808,009 | * | 2/1989 | Sittler et al. | 374/178 |
| 6,114,671 | * | 9/2000 | Wehner et al. | 219/497 |
| 6,163,017 | * | 12/2000 | Corda et al. | 219/497 |

* cited by examiner

Primary Examiner—Tu Ba Hoang
(74) Attorney, Agent, or Firm—Loria B. Yeadon

(57) ABSTRACT

A circuit for controlling the temperature of a thin film conductive heater includes a control circuit for applying a voltage to the heater. The control circuit regulates the temperature of the heater element by using a modeling technique which assumes that the thin film coating functions as a single electrical resistor.

8 Claims, 3 Drawing Sheets

DEVICE AND METHOD FOR CONTROLLING THE TEMPERATURE OF A THIN FILM RESISTIVE HEATER

FIELD OF INVENTION

The present invention relates to a thin film resistive heater and more particularly to a circuit and method for controlling the temperature of a thin film resistive heater used to heat a liquid crystal display.

BACKGROUND OF INVENTION

FIG. 1 shows an exploded view of a conventional module 10 which is used for housing a Liquid Crystal Display (LCD) 14. The module 10 includes a front frame 12, an LCD 14, a thin film resistive heater 16, and a back frame 18. The device 10 is held together by interlocking tabs and recesses.

As is known in the art, if the temperature of the LCD 14 becomes too cold, the liquid crystal material within the LCD 14 becomes increasingly viscous. If such a result occurs, the LCD 14 does not work properly.

In view of this problem, the thin film resistive heater 16 is provided to maintain the temperature of the LCD 14 within a certain temperature range. To perform its heating function, the thin film resistive heater 16 includes a glass substrate 20 which contains a thin film coating of, for example, indium tin oxide (ITO). The substrate 20 is attached to a plastic frame 22. As is known in the art, when a current is passed through the thin film coating, heat is transferred to the glass substrate 20 thus creating a heater.

When the module 10 is assembled, glass substrate 20 of the thin film heater 16 is placed in thermal contact with the LCD 14. This configuration allows for the transfer of heat from the heater 16 to the LCD 14.

Typically, a thermistor 24 is placed on an outer edge of the glass substrate 20 to monitor the temperature of the thin film heater 16. As is known in the art, the thermistor is a device whose resistance is a function of temperature.

Based on the design of the device shown in FIG. 1, the thermistor 24 is required to be placed on an outer edge of the thin film heater 16 to ensure that the thermistor 24 does not interrupt the viewing area of the LCD 14. In particular, if the thermistor 24 is positioned at the center of the glass substrate 20, a shadow will appear on the LCD 14. This is obviously undesirable given that such a shadow would impact the usefulness and desirability of the LCD 14.

FIG. 2 shows a conventional circuit that is used to control and measure the temperature of the thin film heater 16 shown in FIG. 1. The circuit shown in FIG. 2 contains a power supply 26 which provides a supply voltage $V_{SUPP}$ to bus bars 21 of the glass substrate 20 contained within the thin film heater 16. As is known in the art, the application of the voltage $V_{SUPP}$ creates a current I which in turn heats the substrate 20.

The circuit shown in FIG. 2 also contains a temperature feedback circuit 28 which is connected to the power supply 26 and the thermistor 24. The temperature feed back circuit 28 continuously measures the temperature of the thermistor 24.

If the temperature of the thermistor 24 falls below a certain temperature To, the feedback circuit 28 instructs the power supply 26 to apply the voltage $V_{SUPP}$ to the bus bars 21 to heat the glass substrate 20. Conversely, if the temperature of the thermistor 24 reaches temperature To, the feedback circuit 24 then instructs the power supply 26 to remove the voltage $V_{SUPP}$.

While the conventional device discussed above and shown in FIGS. 1 and 2 allows for the temperature of the thermistor 24 to be measured, the device still has significant drawbacks. In particular, the design of the device shown in FIGS. 1 and 2 results in a large thermal mass at the edge of the thin film heater 16 where the thermistor 24 is located. As is known in the art, large thermal masses resist changes in temperature. That is, large thermal masses either maintain temperature for prolonged periods of time or require an inordinately large amount of heat to achieve an increase in temperature.

Given that the edge of the thin film heater 16 is in contact with a large thermal mass and that the thermistor 24 is required to be positioned at this location, it is difficult to accurately monitor and maintain the temperature of thin film heater 16. In view of this problem, there currently exists a need for a device which can accurately measure the temperature of the center of a thin film heater in a manner that is minimally impacted by the thermal mass proximate to the heater and does not affect, in any way, the viewing area of the heater.

SUMMARY OF THE INVENTION

It is accordingly an object of the present invention to provide a device which can accurately measure the temperature of a thin film heater which is minimally impacted by a surrounding thermal mass.

It is another object of the invention to provide a device which can accurately measure the temperature of a thin film heater that does not, in any way, impact the viewing are of the thin film heater.

In accordance with the invention, a device and method are disclosed which regulate the temperature of a thin film heating element by using a modeling technique which assumes that the thin film coating of the heater functions as a single electrical resistor.

In accordance with one embodiment of the invention, a circuit for controlling the temperature of a heating device is disclosed where the circuit comprises: a heater containing a thin film coating; and a control circuit for applying a voltage to the heater; wherein the control circuit regulates the temperature of the heater by using a modeling technique which assumes that the thin film coating functions as a single resistor.

In accordance with another aspect of this embodiment of the invention, the control circuit includes: a power supply for applying a voltage to the heater; a resistor that is connected in series with the power supply and the heater; a voltage sensing device which measures voltage drops occurring across the resistor; and, a temperature control circuit which monitors the voltage sensing means and the power supply to regulate the temperature of the heater.

In accordance with another aspect of this embodiment of the invention, the temperature control circuit regulates the temperature of the heater by: (i) calculating the resistance of the thin film coating and,(ii) calculating the temperature of the thin film coating based on the calculated resistance.

In accordance with yet another aspect of this embodiment of the invention, the resistance of the thin film coating is calculated by using the equation $R_2 = R_1(V_{SUPP}/V_1 - 1)$.

In accordance with even yet another aspect of this embodiment of the invention, the temperature of the thin film coating is calculated by using the equation $T_2 = T_0 + (R_2 - R_0)/a$.

In accordance with another embodiment of the invention, a method for calculating the temperature of a heater containing a thin film coating is disclosed, where the method comprises the steps of: (i) calculating a resistance of the thin film coating, and, (ii) calculating a temperature of the thin film coating based on the resistance calculated in step (i).

In accordance with another aspect of this embodiment of the invention, the resistance of the thin film coating is calculated by using the equation $R_2=R_1(V_{SUPP}/V_1-1)$.

In accordance with still another aspect of this embodiment of the invention, the temperature of the thin film coating is calculated by using the equation $T_2=T_0+(R_2-R_0)/a$. dr

BRIEF DESCRIPTION OF THE DRAWINGS

The accompanying drawings are included to provide an understanding of the invention and constitute a part of the specification.

DESCRIPTION OF THE INVENTION

Figure 1:
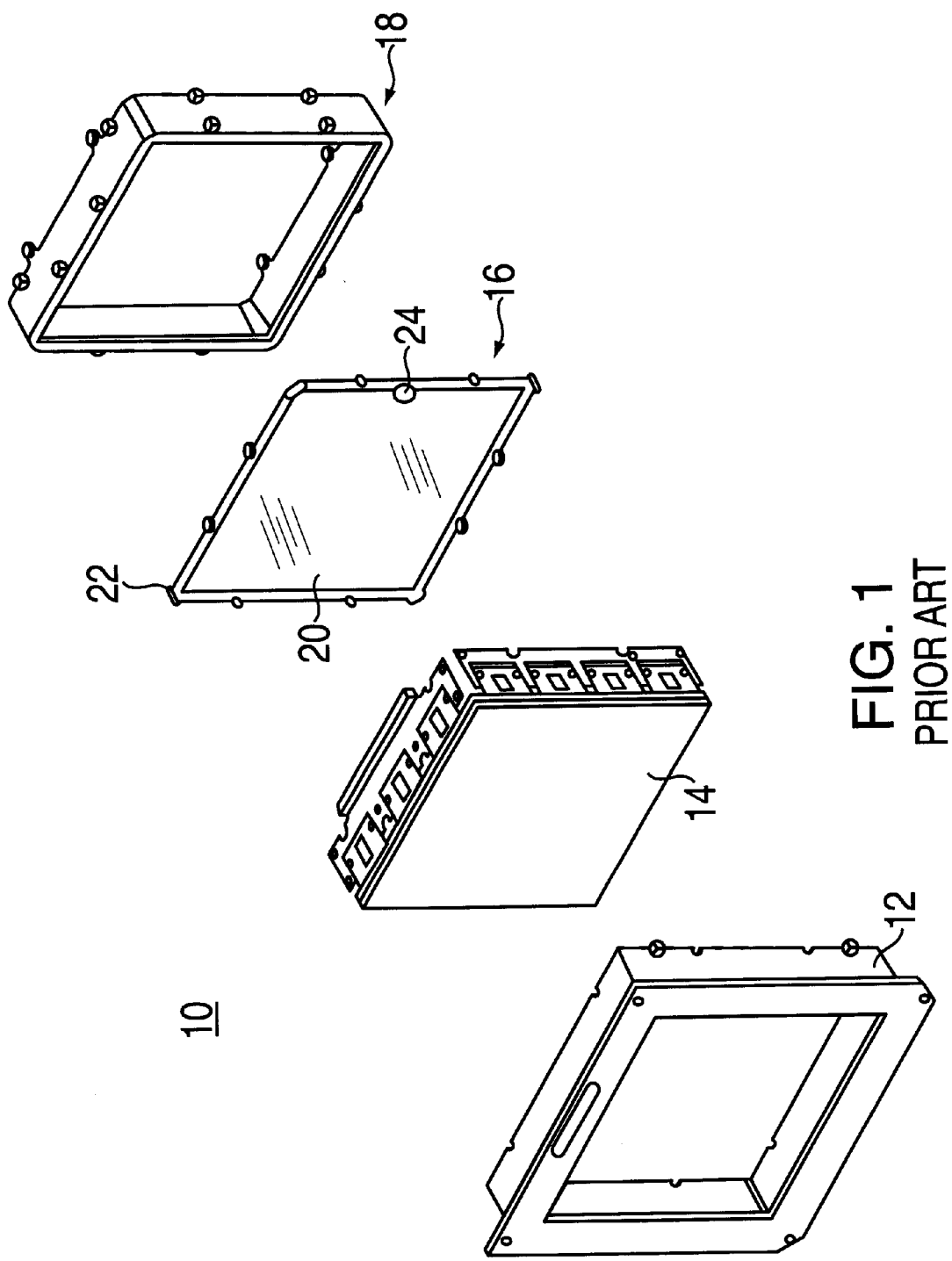
FIG. 1 illustrates an exploded view of a conventional module which is used for housing an LCD.
Figure 2:
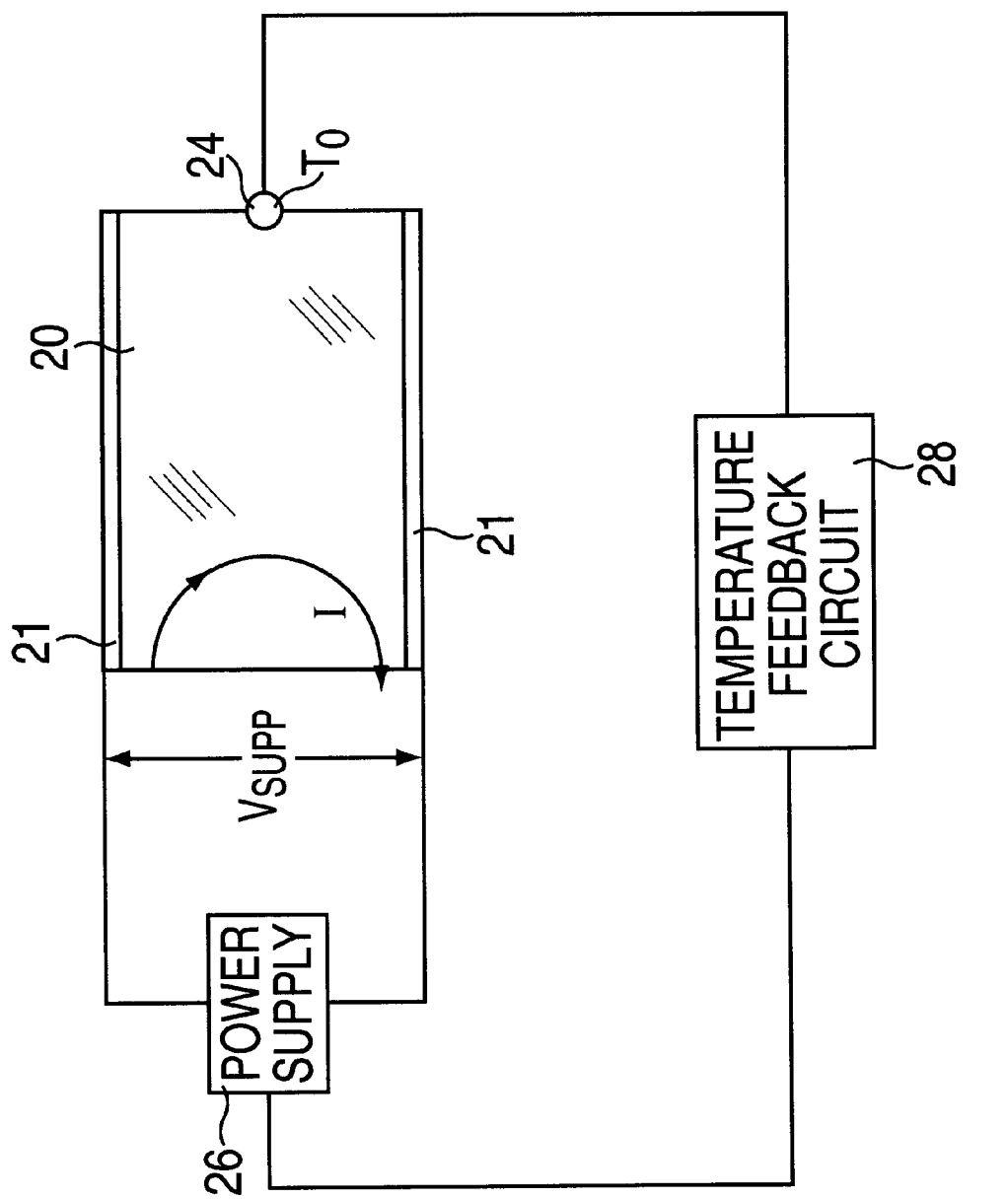
FIG. 2 illustrates a conventional circuit which is used to control and measure the temperature of a thin film heater shown in FIG. 1; and, FIG. 3 is a schematic representation of an illustrative embodiment of the present invention that is used to control and measure the temperature of a thin film heater.
Figure 3:
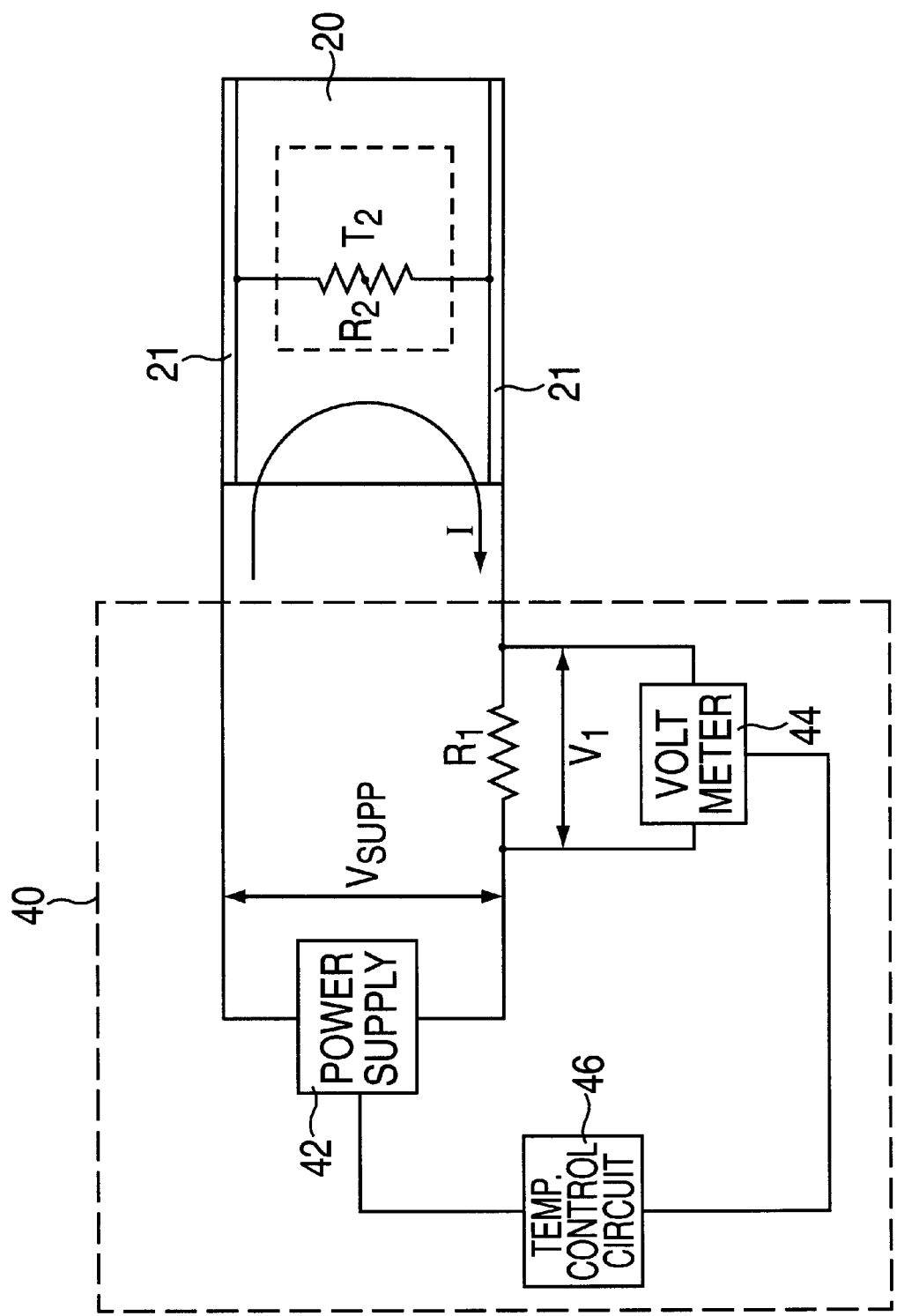

FIG. 3 shows a circuit 40 in accordance with the present invention. The circuit 40 is used to control and measure the temperature of a thin film heater containing a glass substrate with a thin film coating.

The circuit 40 contains a power supply 42 and resistor $R_1$. Both devices are connected in series to bus bars 21 of the glass substrate 20. Power supply 42 provides a supply voltage $V_{SUPP}$ to bus bars 21 of the substrate 20 to produce a current I though the thin film coating. The current I in turn heats the substrate 20.

The circuit 40 also includes a voltmeter 44 and a temperature control circuit 46. The voltmeter 44 is used to measure voltage drops which occur across resistor $R_1$. The temperature control circuit 46 is used to control both the power supply 42 and voltmeter 44.

The circuit 40, unlike the conventional device described above, does not require the use of a thermistor to measure the temperature of the edge of the substrate 20. The circuit 40 developed in accordance with the present invention overcomes this problem by assuming, that the thin film coating on the lass substrate 20 constitutes a resistor $R_2$. Based on this assumption, the circuit 40 uses a mathematical modeling, technique to calculate the temperature $T_2$ of the thin film coating, and substrate 20.

It is important to point out that the resistor $R_2$ shown of FIG. 3 is provided for illustrative purposes only. The thin film coating, on the glass substrate 20 shown in FIG. 3 does not include a resistor $R_2$. The circuit 40 only assumes that the thin film coating constitutes a resistor $R_2$ for modeling purposes. This assumption is valid given that the resistance of the material used for the thin film coating, such as indium tin oxide, is generally found to be a function of the material's temperature.

Based on this assumption, the circuit 40 calculates the temperature $T_2$ of the thin film coating on the glass substrate 20 using a mathematical modeling technique which involves a two step calculation. This two step calculation is described in detail below with reference to Equations 1 through 4.

First, the circuit 40 calculates the assumed resistance $R_2$ of the thin film coating. This value is calculated on a realtime basis, usually once every second, by the temperature control circuit 46.

The temperature control circuit 46 performs this first calculation by using, Equation 1 below.

$$R_2=R_1(V_{SUPP}/V_1-1) \qquad \text{Equation 1}$$

Referring to Equation 1, $R_1$ is a known resistance value, $V_1$ is a known value based on measurements obtained by voltmeter 44, and $V_{SUPP}$ is a known value. With these known variables, $R_2$ is calculated by the temperature control circuit 46.

Once $R_2$ is computed, the second calculation is performed by the circuit 46. The second calculation computes the temperature $T_2$ of the thin film coating on the substrate 20 by using Equations 2 through 4 below.

As indicated above, the resistance $R_2$ of the thin film coating on glass substrate 20 can be expressed as a function of the coating's temperature. This mathematical temperature is shown as Equation 2 below.

$$R_2=R_0+a(T_2-T_0)+b(T_2-T_0)^2+ \qquad \text{Equation 2}$$

By truncating Equation 2, the resistance $R_2$ of the coating can be approximated by Equation 3 below.

$$R_2=R_0+a(T_2-T_0) \qquad \text{Equation 3}$$

Equation 3 can then be solved for $T_2$ and represented as shown in Equation 4 below.

$$T_2=T_0+(R_2-R_0)/a \qquad \text{Equation 4}$$

Referring to Equation 4, $T_0$ is a reference temperature of the thin film coating contained on glass substrate 20 at which the coating's resistance $R_0$ is known, $R_0$ is a resistance of the coating at the temperature $T_0$, and the coefficient "a" is a constant that is unique to the particular materials of the coating. With these variables being known and $R_2$ being known from the first calculation, $T_2$ is then calculated by the temperature control circuit 46. This calculation is also performed on a realtime basis which is usually once/second.

By assuming that the thin film coating contained on the glass substrate 20 constitutes a resistor and using the mathematical models described above, the circuit 40 developed in accordance with the present invention calculates the temperature $T_2$ of the coating on the glass substrate contained within a thin film heater. Moreover, circuit 40 is able to calculate the temperature $T_2$ in a manner that is minimally impacted by the thermal mass proximate to the thin film heater and does not impact the viewing are of the substrate 20.

The present invention is not to be considered limited in scope by the preferred embodiments described in the specification. For example, while the invention described herein is used as a device for heating for LCD's, the invention can be used in any type of thin film heating device. Additional advantages and modifications, which will readily occur to those skilled in the art from consideration of the specification and practice of the invention, are intended to be within the scope and spirit of the following claims.

I claim:

1. A circuit for controlling the temperature of a heater containing a thin film conductive coating, said circuit comprising:

a control circuit for applying a voltage to said heater and said control circuit including:

a power supply for applying a voltage to said heater;

a resistor that is connected in series with said power supply and said heater;

a voltage measuring device which measures voltage drops occurring across said resistor; and a temperature control circuit which monitors said voltage measuring device and said power supply to regulate the temperature of said heater by using a modeling technique which assumes that said thin film coating functions as a single resistor.

2. The circuit of claim 1, wherein said temperature control circuit regulates the temperature of said heater by:

(i) calculating the resistance of said thin film coating and, (ii) calculating the temperature of said thin film coating based on the calculated resistance.

3. The circuit of claim 2, wherein said resistance $R_2$ of said thin film coating is calculated by using the equation $R_2=R_1(V_{SUPP}/V-1)$, where $R_1$ is the resistance value of said resistor, $V_1$ is a value based on a voltage drop across said resistor, and $V_{SUPP}$ is a known value.

4. The circuit of claim 3 wherein said temperature $T_2$ of said thin film coating is calculated by using the equation $T_2=T_0+(R_2-R_0)/a$, where $T_0$ is a reference temperature of the thin film conductive coating, and "a" is a constant unique to the material of the coating.

5. A method for calculating the temperature of a heater containing a thin film resistive coating, said method comprising the steps of:

(i) calculating a resistance $R_2$ of said thin film coating by using the equation $R_2=R_1 (V_{SUPP}/V_1-1)$, wherein $V_{SUPP}$ represents a voltage applied to said heater, $R_1$ represents a resistance value of a resistor connected in series to said heater, and $V_1$ represents a voltage drop across resistor $R_1$; and (ii) calculating a temperature of said thin film coating based on the resistance calculated in step (i).

6. The method of claim 5, wherein said temperature of said thin film coating is calculated by using the equation $T_2=T_0+(R_2-R_0)/a$, wherein $T_0$ represents a reference temperature of said thin film coating at a known resistance, $R_0$ represents a resistance of said thin film coating, at a known temperature, and the coefficient "a" represents a constant that is unique to said thin film coating.

7. A circuit for controlling the temperature of a glass substrate thin film resistive heater in a liquid crystal display, said circuit comprising:

a power supply for applying a voltage to a thin film resistive coating on said glass substrate;

a resistor connected in series with said power supply and said thin film resistive coating;

a voltmeter connected across said resistor for measuring the voltage drop thereacross; and a temperature control circuit responsive to said voltmeter and connected to said power supply to regulate the temperature of said resistive coating on said glass substrate.

8. A method for controlling the temperature of a glass substrate heater in a liquid crystal display, the glass substrate heater being connected to a power supply, said method comprising the steps of:

calculating the voltage drop across a resistor in series with the glass substrate heater and the power supply; and controlling the current supplied by the power supply to the glass substrate heater in response to the calculated voltage drop to control the temperature of the glass substrate heater.

* * * * *